(12) United States Patent
Posselius et al.

(10) Patent No.: US 8,310,354 B2
(45) Date of Patent: Nov. 13, 2012

(54) DETERMINATION OF RELATIVE POSITION OF TWO RELATIVELY MOVABLE ELEMENTS

(75) Inventors: John H. Posselius, Ephrata, PA (US); Riccardo Morselli, San Vito di Spilamberto (IT); Renzo Cicilloni, Brussels (BE); Andrea Saroldi, Turin (IT); Maurizio Miglietta, Turin (IT); Silvano Marenco, Mondovi (IT)

(73) Assignee: CNH America LLC, New Holland, PA (US)

( * ) Notice: Subject to any disclaimer, the term of this patent is extended or adjusted under 35 U.S.C. 154(b) by 707 days.

(21) Appl. No.: 12/584,327

(22) Filed: Sep. 3, 2009

(65) Prior Publication Data
US 2010/0066517 A1 Mar. 18, 2010

(30) Foreign Application Priority Data
Sep. 5, 2008 (EP) .................................. 08425592

(51) Int. Cl.
*B60Q 1/00* (2006.01)
(52) U.S. Cl. ........................ 340/435; 340/436
(58) Field of Classification Search .................. 340/435, 340/436; 700/300
See application file for complete search history.

(56) References Cited

U.S. PATENT DOCUMENTS
2007/0109111 A1* 5/2007 Breed et al. .................. 340/435

FOREIGN PATENT DOCUMENTS
WO WO 2007/122394 11/2007
* cited by examiner

*Primary Examiner* — Shirley Lu
(74) *Attorney, Agent, or Firm* — Michael G. Harms

(57) ABSTRACT

A system for determining and/or controlling the relative position of two relatively movable elements, comprising a vehicle container combination, a utility vehicle including an unloading apparatus and at least three transmitting devices intended to be fitted, in use, in a predetermined spatial arrangement to one of the two relatively elements and configured to transmit respective signals; a single sensor device intended to be fitted, in use, to the other of the two relatively movable elements and configured to receive, and to determine the source direction ($\psi_i$, $\Phi_i$) of, the signals transmitted by the transmitting devices; and an electronic processing unit connected to the sensor device and configured to determine the relative position of the two relatively movable elements based on the source direction ($\psi_i$, $\Phi_i$) of the signals transmitted by the transmitting devices, and on the spatial arrangement of the transmitting devices.

14 Claims, 4 Drawing Sheets

DETERMINATION OF RELATIVE POSITION OF TWO RELATIVELY MOVABLE ELEMENTS

CROSS REFERENCE TO RELATED APPLICATIONS

This Patent Application claims priority under 35 U.S.C. §119 to EPO 08425592.6, filed on Sep. 5, 2008 titled, "DETERMINATION OF RELATIVE POSITION OF TWO RELATIVELY MOVABLE ELEMENTS" and having JOHN H. POSSELIUS, RICCARDO MORSELLI, RENZO CICILLONI, ANDREA SAROLDI and MARENCO SILVANO as inventors. The full disclosure of EPO 08425592.6 is hereby fully incorporated herein by reference.

The present invention relates to determination of relative position of two relatively movable elements.

The present invention may found advantageous, though not exclusive, application to the automotive field to determine the relative position of two relatively movable vehicles, or of a vehicle' with respect to a fixed reference, e.g. for maneuvering, to which the following description refers purely by way of example and without loss of generality.

Of these applications, the present invention may be used to particular advantage in automatic guidance systems for heavy-duty road freight vehicles, such as semitrailers, for maneuvering up to freight loading and unloading bays; or on agricultural vehicles for synchronizing the movement /speed of a combine-harvester and a tractor equipped with a crop-loading wagon, to ensure a precise relative positioning of the two vehicles, and hence of the crop feed tube from the combine-harvester with respect to the crop-loading wagon.

As is known, the problem of determining the relative position of two relatively movable vehicles, or of one vehicle with respect to a fixed reference—hereinafter referred to as "target" for the sake of simplicity—is common to numerous applications, e.g. to enable a vehicle to automatically follow the vehicle in front, or to manoeuvre a vehicle with respect to a fixed land reference.

To do this, various techniques are commonly employed based on on-vehicle sensors, such as radar, video cameras or lasers, or on determining the absolute position of both the vehicle and the target.

More recently, increasing use is also being made of techniques employing radio locating systems comprising active signal-transmitting tags, and sensors which measure the time difference of arrival (TDOA) and, is in some cases, also the angles of arrival (AOA) of the signals transmitted by the tags.

WO 2007/122394, for example, proposes a locating system designed to locate one or more tags, and comprising two or more, preferably four, tag locating sensors which receive UWB (ultra wideband) pulses transmitted by the tags and, based on the angle and the time difference of arrival of the signals, locate the tags fairly accurately (to within about 15 cm).

Though of good performance and, above all, designed to operate in widely different environmental conditions, this type of radio locating system has the drawback of requiring a plurality of tag locating sensors and, bearing in mind the much higher cost of the tag locating sensors as compared with the tags, is therefore fairly expensive.

It is an objective of the present invention to provide a system for determining the relative position of two relatively movable elements, which is simpler and cheaper than the above radio locating systems.

According to the present invention, there is provided a system for determining the relative position of two relatively movable elements, as claimed in the accompanying Claims.

A preferred, non-limiting embodiment of the is present invention will be described by way of example with reference to the accompanying drawings, wherein:

FIG. 5 shows a top view of a utility vehicle with three transmitting devices on its unloading tube and a vehicle container combination with a sensor on the vehicle;

Figure 1:
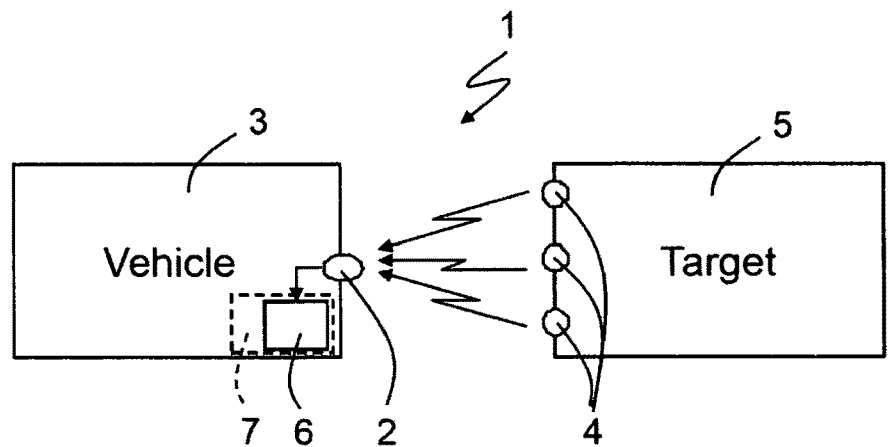
FIG. 1 shows a basic block diagram of a system for determining the relative position of a vehicle with respect to a target according to the present invention.

The idea underlying the present invention is to achieve the objective of the invention using a system for determining the relative position of the vehicle with respect to target using a single sensor, which is intended to be fitted, in use, to either of the vehicle and the target, and three or more transmitters—hereinafter referred to as "tags" for the sake of simplicity—intended to be fitted, in use, to the other of either the vehicle or the target. The three tags are fitted to the vehicle or the target in a predetermined spatial arrangement, and are designed to transmit radio frequency (RF) signals enabling the sensor to determine the source direction and, in particular, the horizontal and vertical angles of arrival (azimuth and elevation) of the signals; and the sensor is designed to measure the vertical and horizontal angles of arrival of the signals transmitted by the tags, which correspond to the angles formed between the three tags and the sensor. Based on the vertical and horizontal angles of arrival of the signals transmitted by the tags, and taking account of the spatial arrangement of the tags, an appropriately programmed electronic processing unit connected to the sensor determines the relative position of the vehicle with respect to the target by implementing an algorithm described in detail below.

The tags and the sensor are commonly marketed types and may be of any technology enabling implementation of the invention. That is, the tags may be of any technology enabling the transmission of signals allowing the sensor to determine the horizontal and vertical angles of arrival of the signals, and the sensor may be of any technology enabling measurement of the vertical and horizontal angles of arrival of the signals transmitted by the tags.

By way of a non-limiting example, the technology of the tags and the sensor may be the one described in the aforementioned WO 2007/122394. That is, each tag may comprise a UWB radio transmitter designed to transmit UWB pulses; a battery-type electric energy source; and a microcontroller programmed to control operation of the UWB radio transmitter, and storing a unique identification code that is transmitted together with the UWB pulses to allow the tag to be identified/recognized.

Similarly, the sensor may comprise a UWB radio receiver designed to receive UWB pulses; and a microcontroller programmed to control operation of the UWB radio receiver, and to process the signals received by the UWB radio receiver to determine the horizontal and vertical angles of arrival of the signals transmitted by the tags, and therefore the source direction of the incoming signals, based on which the electronic processing unit determines the relative position of the sensor with respect to the tags. Additionally, the sensor may be either electrically supplied from the outside, for example by the vehicle battery, or provided with an electric energy source, for example a battery.

The source direction of the signals transmitted by the tags may, for example, be determined by the microcontroller based on the basis the phase differences of the incoming signals received by different antennas of the UWB radio receiver. Four antennas are sufficient to determine both the azimuth and elevation angles.

FIG. 1 shows a basic block diagram of the system, referenced as a whole by 1, for determining the relative position of the vehicle with respect to the target according to the present invention, wherein the sensor, referenced by 2, is fitted to the vehicle, referenced by 3, and the three tags, referenced by 4, are fitted to the target, referenced by 5, are aligned and equally spaced apart by a distance L. Finally, number 6 references the electronic processing unit programmed to determine the relative position of the sensor' with respect to the target based on the output from the sensor.

Sensor 2 and electronic processing unit 6 may conveniently be integrated in the infotelematic system, referenced schematically by 7, of the vehicle 3, so the operations performed by the electronic processing unit, and described in detail below, may be performed directly by the electronic central processing and control unit (ECU) of the infotelematic system 7. This integration would allow, for example, the distance of the vehicle 3 from another vehicle or from a fixed reference to the displayed on a display of the telematic data system 7.

Figure 2:
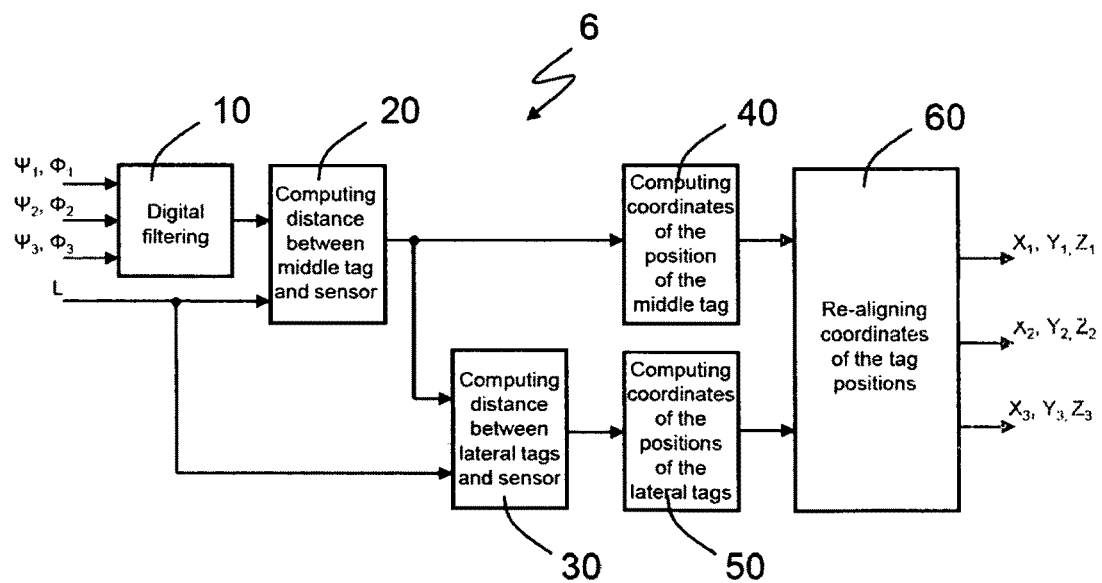
FIG. 2 shows a functional block diagram of an electronic processing unit programmed to determine the relative position of the vehicle with respect to the target.
Figure 3:
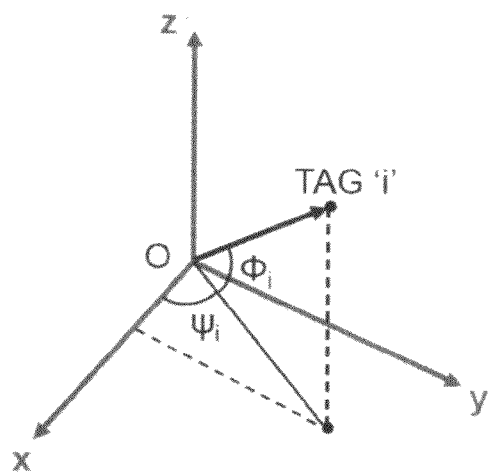
FIGS. 3, 4 and 5 show geometric quantities taken into consideration during the determination of the relative position of the vehicle with respect to the target.
Figure 4:
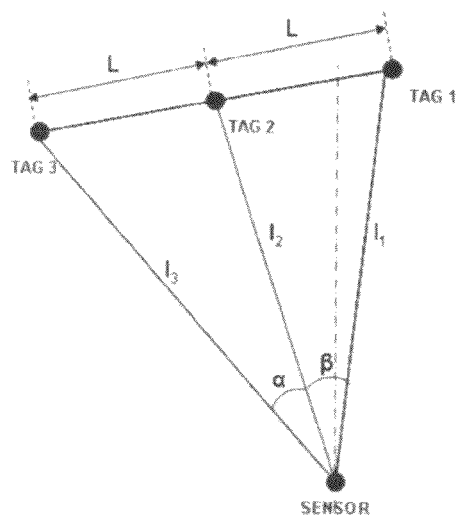
Figure 5:
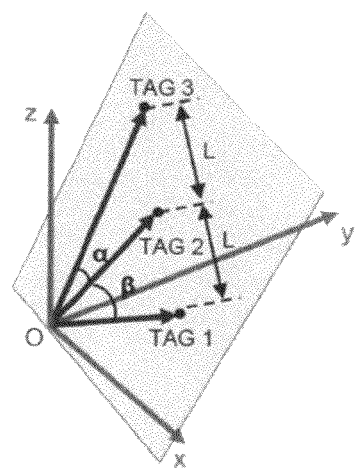

FIG. 2 shows a functional block diagram of the electronic processing unit 6 programmed to determine the relative position of the vehicle with respect to the target by implementing an algorithm which is described herebelow with reference to FIGS. 3, 4 and 5, which show geometric quantities employed in the algorithm.

As shown in FIG. 2, following a preliminary digital filtration (block 10) of the horizontal and vertical angles of arrival—referenced by $\psi_i$ and $\Phi_i$ in FIG. 3—of the signals transmitted by the tags, the electronic processing unit 6 computes the distance between one of tags 4, e.g. the one in the middle, and the sensor 2 (block 20) using space vector relations. Having recourse to various theorems and geometric considerations, the electronic processing unit 6 then computes the distances between the other two tags 4—the lateral ones in the example considered—and the is sensor 2 (block 30), and then the cartesian coordinates $x_i$, $y_i$, $z_i$ of the three tags 4 in a cartesian system with the origin at the sensor 2 (blocks 40 and 50). Finally, to mitigate the effect of any noise between the measurements of the horizontal and vertical angles $\psi_i$ and $\Phi_i$, the cartesian coordinates $x_i$, $y_i$, $z_i$ of the three tags 4 are realigned in a straight line (block 60) to reflect the aligned spatial arrangement of the tags 4.

More specifically, the purpose of the digital filtration is to eliminate or at least mitigate the noise perturbing the measurement of the horizontal and vertical angles of arrival of the signals transmitted by the tags. The digital filtration is performed using an N-order moving-average digital filter, which is applied to the last N measurements by the sensor and has the purpose of averaging out the tag position measurement over time, so as to make it more stable. The digital filtration by the N-order moving-average digital filter may be represented mathematically by the following formula:

$$y(k) = \sum_{i=0}^{N-1} \frac{1}{p_i} \cdot x(k-i)$$

wherein:
y(k) is the k-th filtered measurement;
x(k−i) is the k-th measurement;
$p_i$ is a weighting coefficient for the i-th measurement.

Computation of the distance between the middle tag and the sensor comprises identifying the middle tag of the three tags, and computing the distance between it and the sensor.

The middle tag can be identified simply based on the identification codes transmitted by the tags, and their spatial arrangement. If identification cannot be made based on the tag identification codes, the middle tag can be identified bearing in mind that the horizontal and vertical angles of arrival of the signals transmitted by it and measured by the sensor lie between the horizontal and vertical angles of arrival of the signals transmitted by the other two tags.

To compute the distance between the middle tag and the sensor, it is necessary to first compute the angles $\alpha$ and $\beta$ between the lines which, in the plane containing both the sensor and the three aligned tags, ideally connect the sensor to respective tags (see FIGS. 4 and 5).

Angles $\alpha$ and $\beta$ are computed based on the horizontal and vertical angles $\psi_i$ and $\Phi_i$ measured by the sensor, according to the formulas shown below, which are obtained using the scalar product r elation of two vectors and the passage from spherical to cartesian coordinates:

$\alpha = \arccos(\cos\phi_2 \cos\psi_2 \cos\phi_3 \cos\psi_3 + \cos\phi_2 \sin\psi_2 \cos\phi_3 \sin\psi_3 + \sin\phi_2 \sin\phi_3)$ $\beta = \arccos(\cos\phi_1 \cos\psi_1 \cos\phi_2 \cos\psi_2 + \cos\phi_1 \sin\psi_1 \cos\phi_2 \sin\psi_2 + \sin\phi_1 \sin\phi_2)$ Once angles $\alpha$ and $\beta$ have been computed, it is possible to compute the distance between the sensor and the middle tag. That is, given that the middle tag and the sensor lie in the same plane, and that the middle tag (tag 2) is equidistant from the two lateral tags (tags 1 and 3), the sine rule can be applied to the two triangles with sides $l_1$-$l_2$-L and $l_2$-$l_3$-L. having recourse to various geometrical considerations to the angles of these triangles, distance $l_2$ between the middle tag and the sensor can be computed based on the angles $\alpha$ and $\beta$ as follows:

$$l_2 = L \cdot \frac{\sin(\alpha+\beta)}{\sqrt{\sin(\alpha)^2 + \sin(\beta)^2 - 2\sin(\alpha)\cdot\cos(\beta)\cdot\cos(\alpha+\beta)}}$$

Once the distance $l_2$ is known, the coordinates of the position of the middle tag can be computed by simply passing from spherical to cartesian coordinates according to the formulas:

$$\begin{cases} x_2 = l_2\cos\phi_2\cos\psi_2 \\ y_2 = l_2\cos\phi_2\sin\psi_2 \\ z_2 = l_2\cos\phi_2 \end{cases}$$

Distances $l_1$ and $l_3$ between the lateral tags and the sensor may the be computed by using the Carnot' s theorem (cosine rule) along with the mean value theorem. In the event of noise in the horizontal and vertical angles $\psi_i$ and $\Phi_I$ measured by the sensor, this solution gives the best estimates of the distances $l_1$ and $l_3$, which therefore are $$\begin{cases} l_1 = l_2\cos\beta \pm \sqrt{(-l_2\cos\beta)^2 - (l_2^2 - L^2)} \\ l_3 = l_2\cos\alpha \pm \sqrt{(-l_2\cos\alpha)^2 - (l_2^2 - L^2)} \\ \min\left\{2l_2^2 - \left[l_3^2 + l_1^2 - \frac{(2L)^2}{2}\right]\right\} \end{cases}$$

The above formulas show that among the four pairs of solutions ($l_1$, $l_3$) obtainable depending on the sign used (+ or −), the one that minimizes the value computed according to the third formula is selected.

Once the distances $l_1$ and $l_3$ are known, the coordinates of the lateral tags may be computed by simply passing from spherical to cartesian coordinates as follows:

$$\begin{cases} x_1 = l_1\cos\phi_1\cos\psi_1 \\ y_1 = l_1\cos\phi_1\sin\psi_1 \\ z_1 = l_1\sin\phi_1 \end{cases}$$

$$\begin{cases} x_3 = l_3\cos\phi_3\cos\psi_3 \\ y_3 = l_3\cos\phi_3\sin\psi_3 \\ z_3 = l_3\cos\phi_3 \end{cases}$$

Because of noise in the horizontal and vertical angles $\psi_i$ and $\Phi_I$ measured by the sensor, the resulting coordinates might not be aligned in a straight line and is therefore not reflect the alignment of the three tags. For this reason, the coordinates are realigned using the least squares or regression line rule. With reference solely to plane (x, y), given N pairs $(x_i, y_i)$ of points, the coefficients m and q (angular coefficient and intercept or y axis at the origin respectively) of the regression line through these points are computed as follows:

$$m = \frac{\sum x_i \cdot \sum y_i - N\sum y_i x_i}{(\sum x_i)^2 - N\sum (x_i)^2}$$

$$q = \frac{\sum x_i \cdot \sum (x_i y_i) - \sum (x_i)^2 \sum y_i}{(\sum x_i)^2 - N\sum (x_i)^2}$$

The coefficients m and q are then used to compute the new longitudinal coordinates $y_i$ of the tags using a line equation:

$$y_i = mx_i + q$$

and substituting the previously obtained values $x_1$, $x_2$, $x_3$ for the unknown x in the equation.

The realigned coordinates (x, y, z) of the three tags with respect to the sensor computed by the electronic processing unit define the position and the orientation of the vehicle with respect to the target.

The advantages of the system according to the present invention may be readily appreciated by those skilled in the art. In particular, it is much cheaper than known radio locating systems since it employs only one sensor in combination with three or more tags.

Moreover, determining the relative position of the vehicle with respect to the tag based on the source direction of the signals transmitted by the tags requires no synchronization of the tags, thus making the system according to the invention easier to install and operate.

Figure 6:
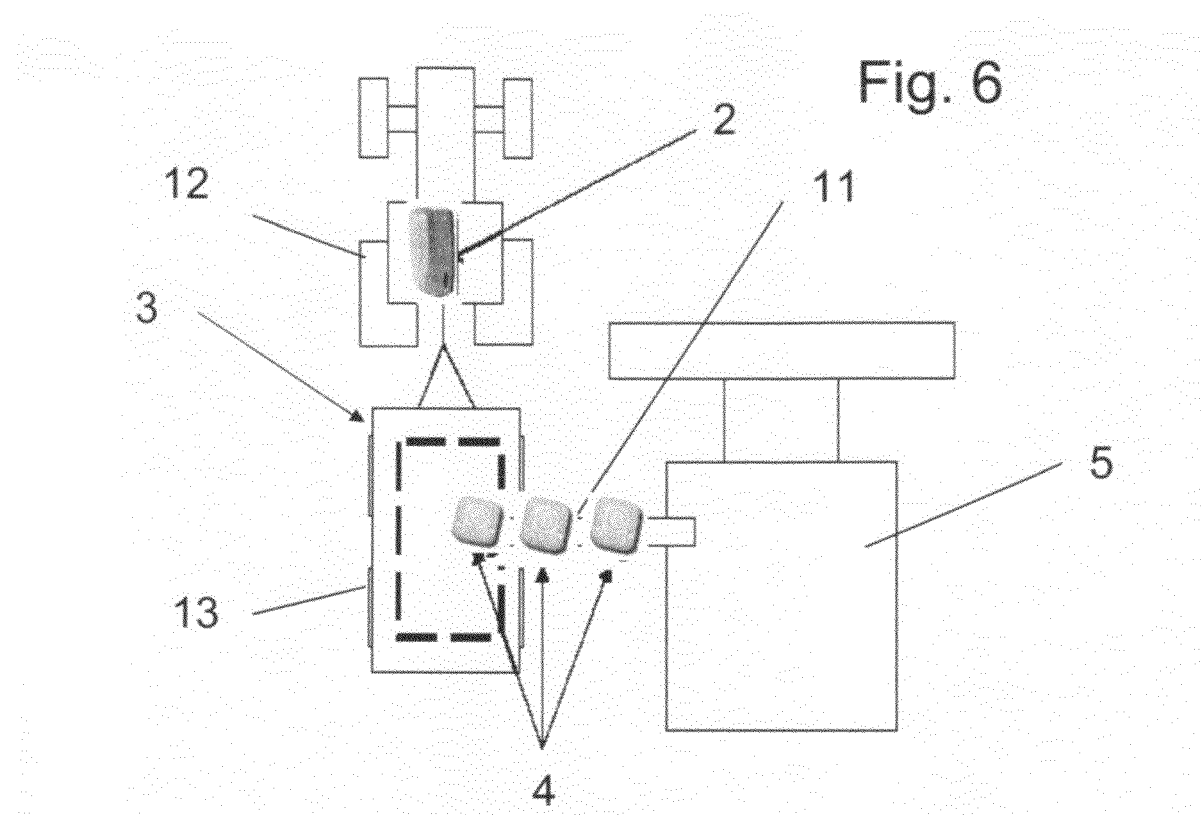
FIG. 6 shows a top view of a utility vehicle with three transmitting devices on its unloading tube and a vehicle container combination with a sensor on the container.

A top view of a vehicle-container combination 3 aligned with an unloading apparatus 11 of a utility vehicle 5 is shown in FIG. 6. Herein the vehicle-container combination 3 is a tractor 12 pulling a grain cart 13 and the utility vehicle 5 is a combine harvester 5 with an unloading tube 11. The unloading tube 11 of the combine 5 is rotated from a rest position to an active position, ready to unload. Three tags 4 are mounted on the unloading tube 11, equally spaced along a straight line. The sensor 2 and the electronic processing unit 6 are mounted on the tractor 12. Alternatively the processing unit 6 may also be mounted on the harvester 5 and communicate with the tractor controls e.g. through wireless communication.

A grain level sensor in the grain tank of the combine harvester 5 signals to the operator when the crop in the grain tank reaches an almost full level. By rotating the unloading tube 11 from a rest position into an active position, transverse to the direction of harvesting, the operator signals to the tractor driver that the grain tank requires unloading. Irrespective of the movement of the combine harvester 5 the tractor driver has to position and keep the grain cart exactly under the exit of the unloading tube 11. To achieve this the operator has to look back over his shoulder and estimate the relative position of the unloading tube with respect to the grain cart while continuously monitoring speed and driving direction of the tractor. Some high capacity combine harvesters 5 may store up to 12.000 liter of grain in their grain tank. Unloading such type of combine harvester 5 particularly requires the highest concentration of a tractor driver, because the relative position of the unloading tube 11 and the cart 13 may vary during the long unloading process.

Figure 7:
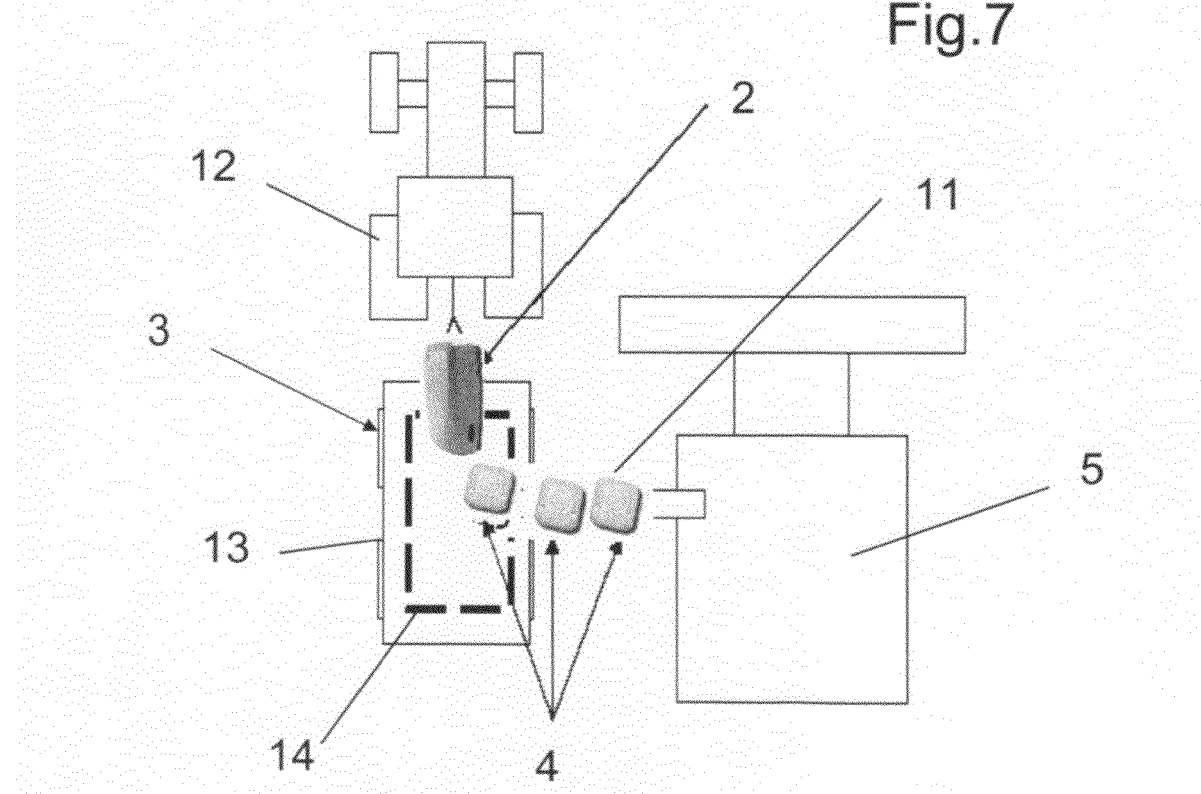

By computing the coordinates of the three tags 4 with respect to the sensor 2 the electronic processing unit 6 establishes the position and the orientation of the tractor 12 with respect to the combine harvester 5. In a further embodiment the sensor 2 is provided on the grain cart 13 itself, as shown in FIG. 7. This arrangement has the advantage of eliminating alignment errors of the tractor 12 with respect to the grain cart 113. Consequently there is no need for applying complex algorithms to correct such errors.

Figure 8:
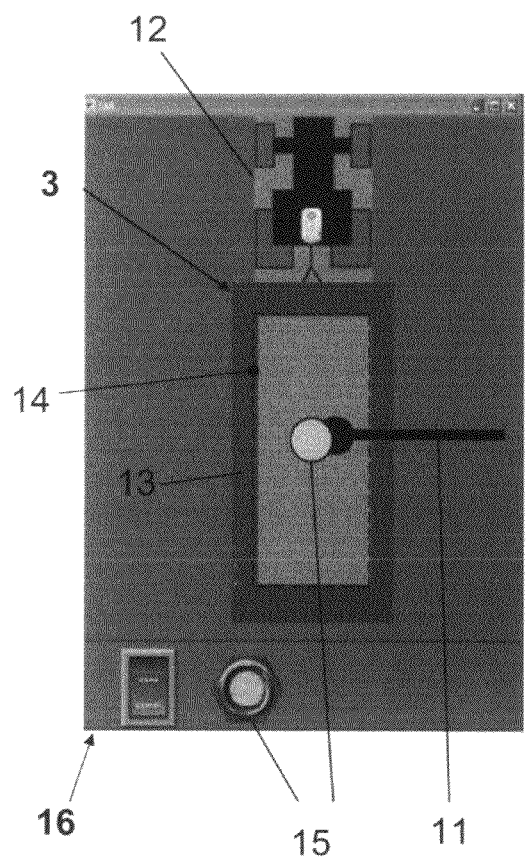
FIGS. 8 and 9 show a tractor display with warning signals.
Figure 9:
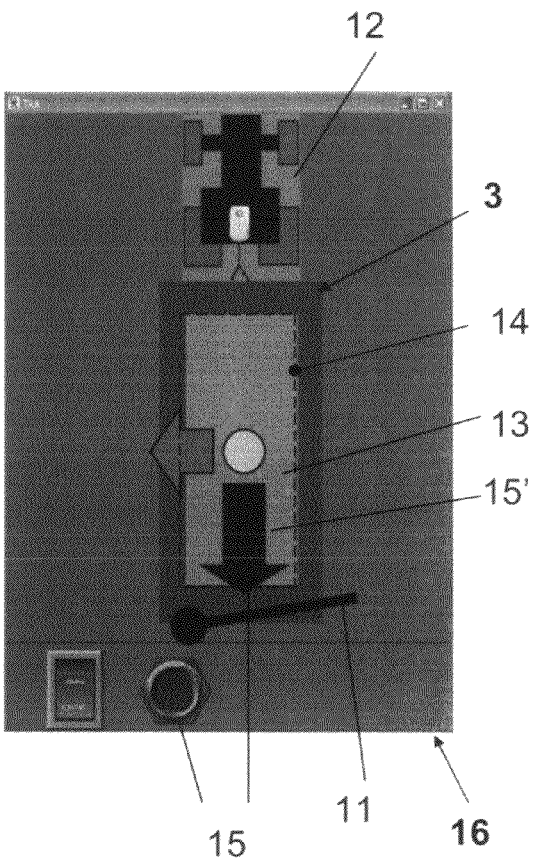

The electronic processing unit 6 now uses the relative position data of tractor 12 and unloading tube 11 to calculate the position of the unloading tube 11 relative to the grain cart 13. In case the exit of the unloading tube 11 is not positioned above the grain cart 13 or not above a safe unloading zone 14 of the grain cart 13, the processing unit 6 will generate a warning signal 15. The safe unloading zone 14 is defined as the area of the grain cart 13 that is a predetermined distance away from the cart walls, as shown in FIGS. 8 and 9.

One basic manner of informing the tractor driver is through a warning light 15 in the tractor dashboard: e.g. a green light 15 indicates a correct position of the grain cart 13 below the unloading tube 11 and a red light 15 indicates a bad position. Another manner of informing the operator is by showing the information graphically on the tractor display as shown in FIG. 8. The exit position of the unload tube 11 is depicted together with a symbolic presentation of the tractor 12 and grain cart 13 and shows any variations of their relative positions. As long as the unloading tube 11 is above the save zone 14 a green indicator or other confirmation is shown. However, as soon as the exit of the unloading tube 11 moves outside the save zone a red indicator is turned on and instructions 15 are presented to the driver in the form of arrows indicating the correct direction to steer. Other combinations of colors, lights and auditive instructions may be used to inform the tractor driver.

In a further development the relative position data of the unloading apparatus 11 and the grain cart 13 may be used in tractor autoguidance and speed control systems, which will control the direction and speed of the tractor 12 to maintain the grain cart 13 below the exit of the unloading tube 11.

This system may be used on all Agricultural and Construction Equipment combinations where the knowledge of the relative position of a vehicle container combination 3 and a utility vehicle 5 having an unloading apparatus 11 is required. For instance unloading forage harvesters also require continuous interaction between the tractor driver and the harvester operator. The spout of the forage harvester is the unloading tube 11. Cold planers (to remove asphalt) load haul trucks via a folding "loading conveyor". It is required that the truck is positioned correctly with respect to the conveyor and during the loading of the truck the relative position will have to change within the boundaries of the container in order to evenly fill the truck.

Clearly, changes may be made to the system as described and illustrated herein without, however, departing from the scope of the present invention as defined in the accompanying Claims.

For example, the spatial arrangement of the three tags may be other than as described, and the electronic processing unit must be appropriately programmed to determine the relative position of the sensor with respect to the tags based on geometric considerations other than those described.

The invention claimed is:

1. A system for determining or controlling a relative position of two relatively movable elements, comprising a vehicle container combination and a utility vehicle including an unloading apparatus, characterized in that the system comprises: at least three transmitting devices intended to be fitted, in use, in a predetermined spatial arrangement to one of the two relatively movable elements and configured to transmit respective signals; a single sensor device intended to be fitted, in use, to the other of the two relatively movable elements and configured to receive, and to determine the source direction ($\psi_i$, $\Phi_i$) of, the signals transmitted by the transmitting devices; and an electronic processing unit connected to the sensor device and configured to determine the relative position of the two relatively movable elements based on the source direction ($\psi_i$; $\Phi_i$) of the signals transmitted by the transmitting devices, and on the spatial arrangement of the transmitting devices;

wherein said electronic processing unit is configured to determine the relative position of the two relatively movable elements by: computing a distance ($l_2$) between a first transmitting device and the sensor device based on the source direction ($\psi_i$, $\Phi_i$) of the signals transmitted by the transmitting devices, and of the spatial arrangement of the transmitting devices; computing distances ($l_1$, $l_3$) between the other transmitting devices and the sensor device based on the distance ($l_2$) between the first transmitting device and the sensor device, and on the spatial arrangement of the transmitting devices; and computing the relative position of the two relatively movable elements based on the distances ($l_1$, $l_2$, $l_3$) between the transmitting devices and the sensor device; and wherein said electronic processing unit is configured to compute the distance ($l_1$) between the first transmitting device and the sensor device by: computing, based on the source direction ($\psi_i$, $\Phi_i$) of the signals transmitted by the transmitting devices, angles ($\alpha$, $\beta$) between lines, which, in a plane containing the sensor device and the transmitting devices, ideally connect the sensor device to respective transmitting devices; and compute the distance ($l_2$) between the first transmitting device and the sensor device based on the computed angles ($\alpha$, $\beta$); and wherein the spatial arrangement of the transmitting devices is defined by the transmitting devices being aligned and spaced apart by a same distance (L); and wherein said electronic processing unit is configured to compute the angles ($\alpha$, $\beta$) between the lines which, in the plane containing the sensor device and the transmitting devices, ideally connect the sensor device to the respective transmitting devices, based on the following formulas: $\alpha$=arccos(cos $\phi_2$ cos $\psi_2$ cos $\phi_3$ cos $\psi_3$+cos $\phi_2$ sin $\psi_2$ cos $\phi_3$ sin $\psi_3$+ sin $\phi_2$ sin $\phi_3$) $\beta$=arccos (cos $\phi_1$ cos $\psi_i$ cos $\phi_2$ cos $\psi_2$+cos $\phi_1$ sin $\psi_1$ cos $\phi_2$ sin $\psi_2$+sin $\phi_1$ sin $\phi_2$) wherein $\alpha$ and $\beta$ are the angles between the lines, and $\psi_i$ and $\phi_i$ are the azimuth and elevation angles defining the source directions of the signals transmitted by the transmitting devices; and, wherein said electronic processing unit is configured to compute the distance ($l_2$) between the first transmitting device and the sensor device based on the following formula: $l2=L \sin(\alpha+\beta)\sin(\alpha)2+\sin(\beta)2-2 \sin(\alpha)\cos(\beta)\cos(\alpha+\beta)$ ##EQU00007## Wherein $l_2$ is the distance between the first transmitting device and the sensor device, and L is the distance between the transmitting devices.

2. A system as claimed in claim 1, wherein said tags are positioned on said unloading apparatus.

3. A system as claimed in claim 1, wherein said electronic processing unit is configured to generate a warning signal when said container is not positioned correctly below the exit of said unloading apparatus.

4. A system as claimed in claim 3, wherein said warning signal is a warning light in the tractor dashboard or said warning signal is shown on the tractor display.

5. A system as claimed in claim 4, wherein said tractor display shows the relative positions of said exit of said unload apparatus with respect to a symbolic presentation of said vehicle container combination and presenting the driver with instructions when said exit of said unload apparatus moves outside a save zone.

6. A system as claimed in claim 1, wherein said electronic processing unit is configured to generate information to control the direction and speed of said vehicle container combination.

7. A system as claimed in claim 1, wherein the electronic processing unit is configured to compute the distances $l_1$, $l_3$) between the other trap devices and the sensor device based on the following formulas:

$$\begin{cases} l_1 = l_2\cos\beta \pm \sqrt{(-l_2\cos\beta)^2 - (l_2^2 - L^2)} \\ l_3 = l_2\cos\alpha \pm \sqrt{(-l_2\cos\alpha)^2 - (l_2^2 - L^2)} \\ \min\left\{2l_2^2 - \left[l_3^2 + l_1^2 - \frac{(2L)^2}{2}\right]\right\} \end{cases}$$

wherein $l_1$ and $l_3$ are the distances between the other transmitting devices and the sensor device.

8. A system as claimed in claim 2, wherein the electronic processing unit is configured to compute the relative position of the two relatively movable elements by:
computing the cartesian coordinates of the positions of the transmitting devices in a reference system having the origin at the sensor device, based on the distances ($l_1$, $l_2$, $l_3$) between the transmitting devices and the sensor device, and on the following formulas:

$$\begin{cases} x_2 = l_2\cos\phi_2\cos\psi_2 \\ y_2 = l_2\cos\phi_2\sin\psi_2 \\ z_2 = l_2\cos\phi_2 \end{cases}$$

$$\begin{cases} x_1 = l_1\cos\phi_1\cos\psi_1 \\ y_1 = l_1\cos\phi_1\sin\psi_1 \\ z_1 = l_1\sin\phi_1 \end{cases}$$

$$\begin{cases} x_3 = l_3\cos\phi_3\cos\psi_3 \\ y_3 = l_3\cos\phi_3\sin\psi_3 \\ z_3 = l_3\cos\phi_3 \end{cases}$$

wherein $x_i$, $y_i$, and $z_i$, are the cartesian coordinates of the positions of the transmitting devices.

9. A system as claimed in claim 8, wherein the electronic processing unit is further configured to:
realign the cartesian coordinates of the positions of the transmitting devices using the least squares rule, so that the realigned cartesian coordinates reflect the alignment of the transmitting devices.

10. A system as claimed in claim 9, wherein the electronic processing unit is configured to realign the cartesian coordinates of the positions of the transmitting devices by:
   computing an angular coefficient (m) and an intercept (q) of a regression line based on the cartesian coordinates of the positions of the transmitting devices; and
   recomputing the cartesian coordinates of the positions of the transmitting devices based on the regression line.

11. A system as claimed in claim 10, wherein the electronic processing unit is configured to compute the angular coefficient (m) and the intercept (q) of the regression line based on the following formulas:

$$m = \frac{\sum x_i \cdot \sum y_i - N \sum y_i x_i}{(\sum x_i)^2 - N \sum (x_i)^2}$$

-continued $$q = \frac{\sum x_i \cdot \sum (x_i y_i) - \sum (x_i)^2 \sum y_i}{(\sum x_i)^2 - N \sum (x_i)^2}$$

wherein m and q are the angular coefficient and the intercept of the regression line.

12. A system as claimed in claim 1, wherein the transmitting devices are configured to transmit RF signals.

13. A system as claimed in claim 1 further comprising an automotive infotelematic system including a sensor device and an electronic processing unit.

14. A system as claimed in claim 1 further comprising a software product loadable into an electronic processing unit and configured to cause, when executed, the electronic processing unit to operate.

* * * * *